Dec. 3, 1946.   J. BOKEENO   2,411,847
METHOD OF EXTRUDING THERMOPLASTIC MATERIALS
Filed Aug. 31, 1944
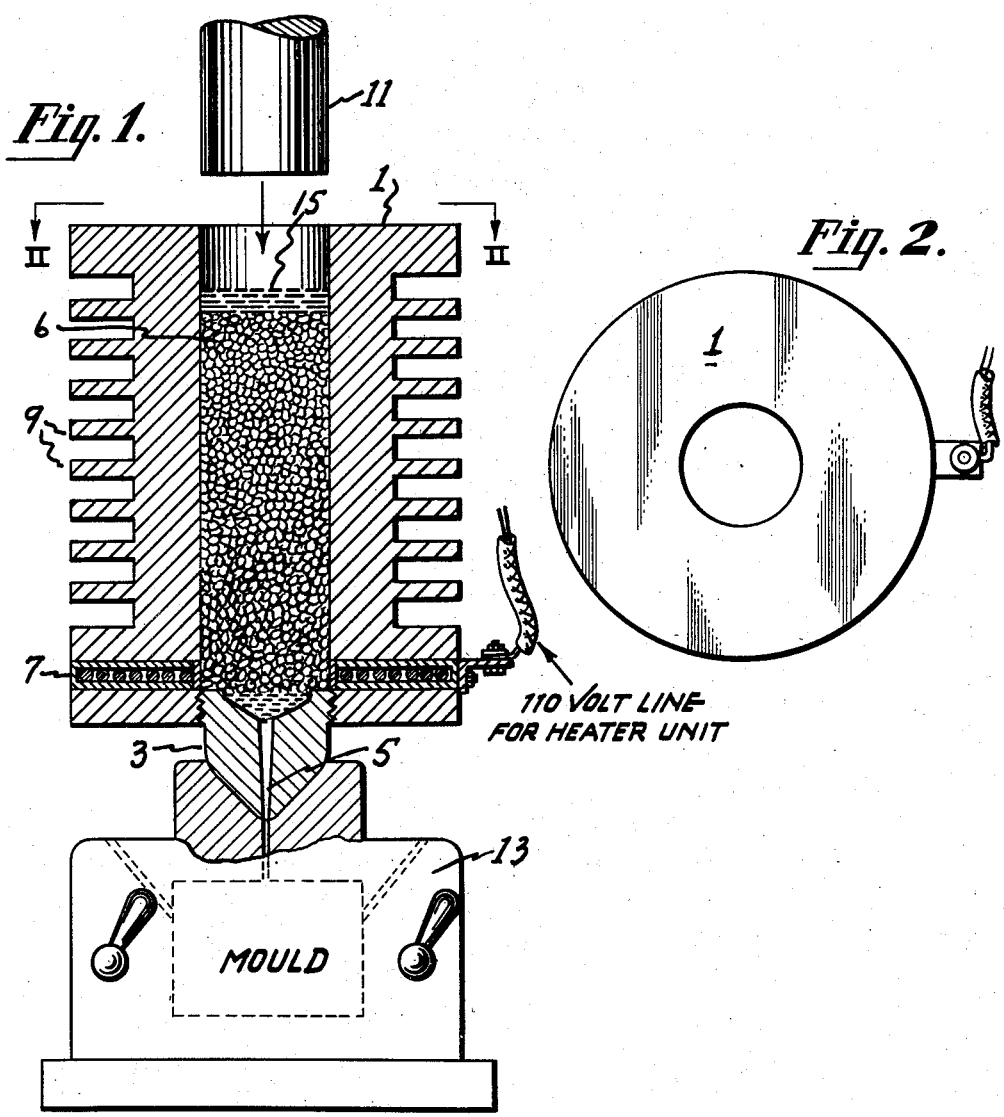
INVENTOR.
John Bokeeno
BY
ATTORNEY Patented Dec. 3, 1946

2,411,847

UNITED STATES PATENT OFFICE 2,411,847

METHOD OF EXTRUDING THERMOPLASTIC MATERIALS

John Bokeeno, Sewell, N. J., assignor to Radio Corporation of America, a corporation of Delaware Application August 31, 1944, Serial No. 552,171

3 Claims. (Cl. 18—55)

This invention relates to improvements in the art of extruding and/or molding thermoplastic materials.

Certain thermoplastics, notably the high melting point "protein plastics," such as "nylon," "exton," etc., do not ordinarily go through an extended softening or progressively plastic state with increasing temperatures, as do most thermoplastic materials, but melt quite sharply, say around 515°–525° Fahrenheit. Extreme care, and especially precision temperature control, is therefore required in the extrusion and molding of such materials. Thus, attempts to mold nylon without using the elaborate "zone heating" methods heretofore recommended, frequently result in a discolored or charred and brittle product.

Accordingly, the principal object of the present invention is to provide a simple, inexpensive and troublefree method of preventing rapid oxidation and other deleterious reactions in the extrusion or molding of nylon and analogous (high melting point) thermoplastic materials, and one which may be practiced without necessarily altering existing apparatus.

The invention will be described in connection with the accompanying drawing, wherein:

Figure 1 is an elevational view, partly in section, of a conventional, vertically disposed open-top cylinder, ram and mold for injection molding of thermoplastic materials, and Fig. 2 is a sectional view taken on the line II—II of Fig. 1.

In the drawing, 1 designates generally a metal cylinder hazing a nozzle 3, which includes an orifice 5, at its lower end, and open at the top to receive a preferably granular molding compound 6 such, for example, as nylon or other protein plastic having a very high melting point. This "standard" machine 1 is provided with a heating coil 7 adjacent to the nozzle 3 for melting the thermoplastic material, and the outer surface of the cylinder is shown provided with a series of heat radiating fins 9 for establishing a temperature gradient within the said cylinder.

A ram 11, mounted in register with the open end of the cylinder 1, and which may be actuated by any conventional means, not shown, is provided for forcing the melted plastic through the orifice 5 in the nozzle 3. The nozzle 3 may communicate, if desired, with a mold 13 if the plastic is to be molded into a particular form.

As previously set forth, nylon and certain other thermoplastic materials have a relatively high and critical melting point and, when exposed to atmospheric pressure in their fluid state, are peculiarly susceptible to oxidation. In order to prevent such oxidation, the present invention dictates the formation of a protective coating in the form of a liquid film 15 upon the exposed (top) surface of the material within the cylinder or other container 1.

In carrying the invention into effect, the container 1 is filled about two-thirds full with the dry, usually granulated molding compound 6 and then compressed, at least to a certain extent, as by bringing down the ram 11. The ram is then raised and a small piece of paraffin wax is placed on the surface of the compressed compound. The heating coil 7 is then energized, whereupon the wax becomes liquid as shown at 15 and, because of its relatively low specific gravity, floats upon the compressed and subsequently fluid molding material. The quantity of paraffin wax within the container need be no more than is required to form a liquid film about $\frac{1}{16}$ of an inch thick on top of the molding material. Additional quantities of molding compound may be added to the cylinder 1 as needed, simply by pouring the dry powder or granules on top of the protective liquid film 15. Since the paraffin or other mineral or vegetable oil or wax employed as the protective coating 15 has a lower specific gravity than the molding material and has no physical or chemical affinity therewith, the oil or wax will rise immediately to the top and thus maintain its protective function. Any simple or convenient form of stopper, not shown, may be employed for closing the orifice 5 during idle periods or when changing molds.

It will now be apparent that the present invention provides a simple, inexpensive and troublefree method of preventing oxidization and other deleterious reactions in the extrusion or molding of nylon and other thermoplastic materials.

What is claimed is:

1. A method of extruding an oxidisable thermoplastic material from a receptacle having an open top and an orifice adjacent to its bottom, comprising placing said material in a solid state in said receptacle, forming a discrete non-miscible liquid layer on the otherwise exposed top surface of said material to prevent oxidation of said surface when said material is exposed to atmospheric pressure at its molding temperature, heating said material at atmospheric pressure to soften it, and then applying mechanical force to said material through the medium of said discrete layer to cause said softened material to be extruded through said orifice.

2. The invention as set forth in claim 1 and including the additional step of replenishing the supply of thermoplastic material in said receptacle by pouring granules of said material into said receptacle through said non-miscible liquid layer.

3. A method of extruding a high melting point thermoplastic material from a receptacle having an open end and an orifice adjacent to its opposite end, said method comprising providing said receptacle with a partial filling of said thermoplastic material in a dry state, compressing said material, placing a low melting wax on the exposed surface of said compressed material, heating the contents of said receptacle at atmospheric pressure to a degree required to soften said thermoplastic and whereby said wax is melted and forms a protective liquid layer on the otherwise exposed top surface of said softened thermoplastic, and then applying mechanical force to said thermoplastic through the medium of said protective layer of liquid to cause said thermoplastic to be extruded through said orifice.

JOHN BOKEENO.